(12) United States Patent
Sato et al.

(10) Patent No.: US 10,145,415 B2
(45) Date of Patent: Dec. 4, 2018

(54) SLIDING MEMBER

(71) Applicant: Senju Metal Industry Co., Ltd., Tokyo (JP)

(72) Inventors: Naoki Sato, Tochigi (JP); Ryoichi Kurata, Tochigi (JP)

(73) Assignee: Senju Metal Industry Co., Inc., Tokyo (JP)

( * ) Notice: Subject to any disclaimer, the term of this patent is extended or adjusted under 35 U.S.C. 154(b) by 34 days.

(21) Appl. No.: 15/024,618

(22) PCT Filed: Sep. 25, 2014

(86) PCT No.: PCT/JP2014/075477
§ 371 (c)(1),
(2) Date: Mar. 24, 2016

(87) PCT Pub. No.: WO2015/046356
PCT Pub. Date: Apr. 2, 2015

(65) Prior Publication Data
US 2016/0238071 A1 Aug. 18, 2016

(30) Foreign Application Priority Data

Sep. 27, 2013 (JP) .................................. 2013-202304

(51) Int. Cl.
*F16C 33/10* (2006.01)
*F16C 33/06* (2006.01)
(Continued)

(52) U.S. Cl.
CPC .............. *F16C 33/10* (2013.01); *F16C 33/06* (2013.01); *F16C 33/103* (2013.01); *F16C 33/12* (2013.01); *F16C 33/14* (2013.01); *F16C 2202/04* (2013.01); *F16C 2204/10* (2013.01); *F16C 2204/12* (2013.01); *F16C 2223/08* (2013.01);
(Continued)

(58) Field of Classification Search
CPC ...... F16C 33/12; F16C 33/14; F16C 2240/54; F16C 2204/10; F16C 2204/12; F16C 2223/08; F16C 2202/04; F16C 2360/42
See application file for complete search history.

(56) References Cited

U.S. PATENT DOCUMENTS 5,338,574 A * 8/1994 O'Neil .................... B05D 3/101
427/377
5,592,840 A * 1/1997 Miyasaka ............... F16C 33/30
29/90.7

(Continued)

FOREIGN PATENT DOCUMENTS

CN          1442617 A      9/2003
CN        101225856 A      7/2008
(Continued)

*Primary Examiner* — James Pilkington
(74) *Attorney, Agent, or Firm* — The Webb Law Firm

(57) ABSTRACT

A sliding member which has a hardness suitable for use under heavy-load conditions and which exhibits excellent abrasion resistance property. A sliding surface is formed on a surface of a sliding layer that slidably supports an object to be slid. The sliding surface is then shot-blasted and is formed to have an uneven shape exhibiting an arithmetic average roughness (Ra) of more than 0 to 2.0 μm, a ten-point average roughness (Rz) of more than 0 to 7.5 μm, and a surface hardness (Hv) of 150 to 250.

3 Claims, 17 Drawing Sheets

(51) Int. Cl.
*F16C 33/12* (2006.01)
*F16C 33/14* (2006.01)

(52) U.S. Cl.
CPC ...... *F16C 2240/40* (2013.01); *F16C 2240/48* (2013.01); *F16C 2240/54* (2013.01); *F16C 2240/60* (2013.01); *F16C 2360/42* (2013.01)

(56) References Cited

U.S. PATENT DOCUMENTS

| | | | |
|---|---|---|---|
| 6,294,029 B1 | 9/2001 | Sakate et al. | |
| 6,338,574 B1 * | 1/2002 | Shimizu | F16C 17/026 384/114 |
| 6,523,456 B1 * | 2/2003 | Kobayashi | F02F 3/00 92/158 |
| 7,541,086 B2 * | 6/2009 | Gartner | F16C 33/201 384/276 |
| 9,303,230 B2 | 4/2016 | Tomikawa et al. | |
| 2003/0091746 A1 | 5/2003 | Takahashi et al. | |
| 2009/0305917 A1 | 12/2009 | Tanizawa et al. | |
| 2009/0311476 A1 | 12/2009 | Stetina et al. | |
| 2010/0158420 A1 | 6/2010 | Michioka et al. | |
| 2011/0052112 A1 | 3/2011 | Yamane et al. | |
| 2013/0216169 A1 | 8/2013 | Zidar | |
| 2015/0049966 A1 | 2/2015 | Sato et al. | |

FOREIGN PATENT DOCUMENTS

| | | | |
|---|---|---|---|
| CN | 101233335 A | | 7/2008 |
| CN | 101400453 A | | 4/2009 |
| CN | 101722357 A | | 6/2010 |
| CN | 101903666 A | | 12/2010 |
| CN | 102918182 A | | 2/2013 |
| DE | 102010053338 A1 | | 6/2012 |
| JP | 07190065 A | | 7/1995 |
| JP | 10267033 A | | 10/1998 |
| JP | 2000303161 A | | 10/2000 |
| JP | 3425496 B2 | | 7/2003 |
| JP | 20062814 A | | 1/2006 |
| JP | 2007284706 A | | 11/2007 |
| JP | 4848821 B2 | | 12/2011 |
| JP | 5304974 B1 | | 10/2013 |
| WO | 2013039177 A1 | | 3/2013 |
| WO | WO2013146108 | * | 10/2013 |

* cited by examiner

[FIG. 1]
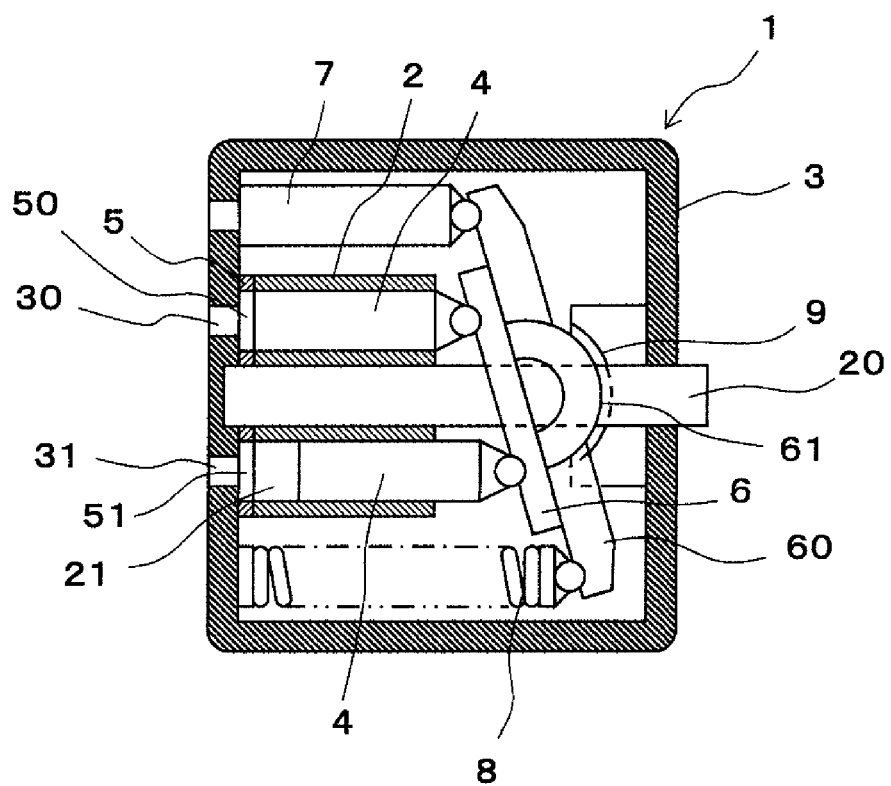

[FIG.2A]
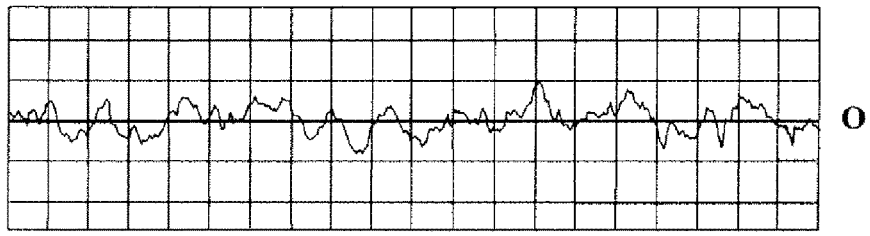
[FIG.2B]
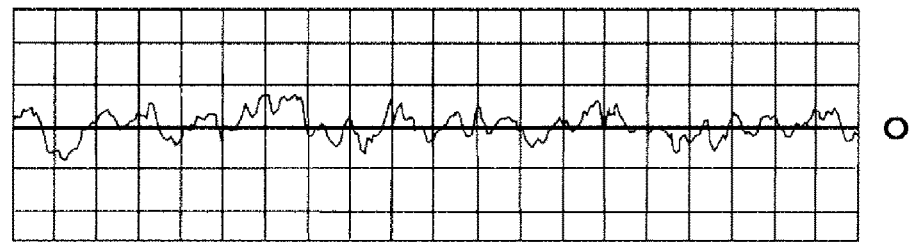
[FIG.2C]
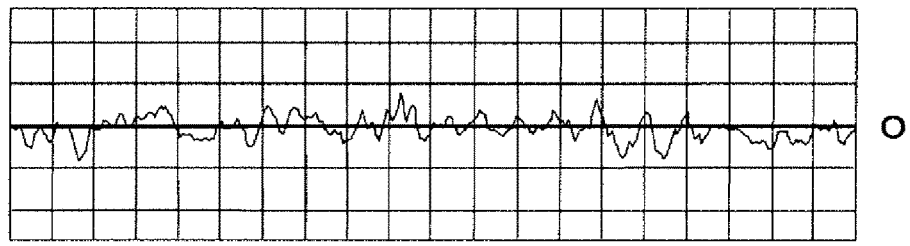

[FIG.3A]
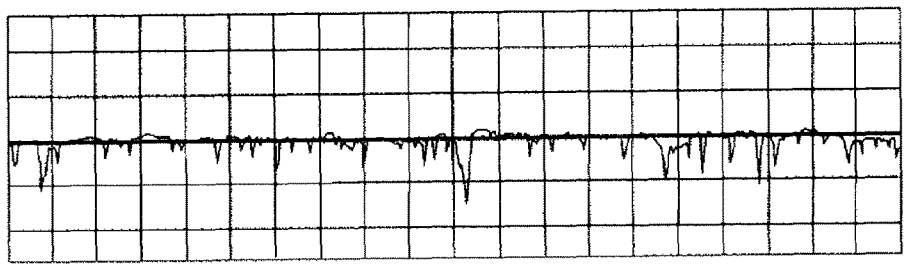
[FIG.3B]
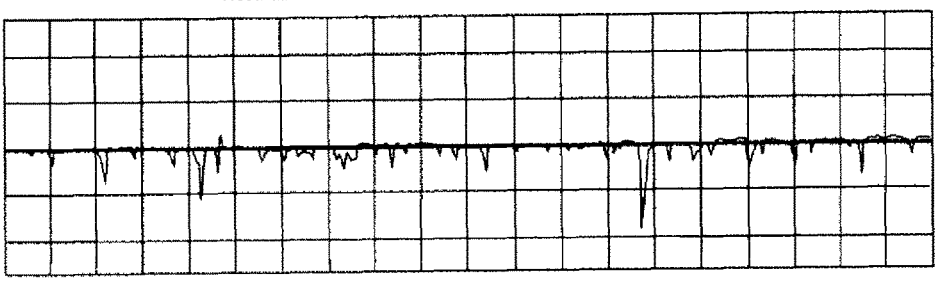
[FIG.3C]
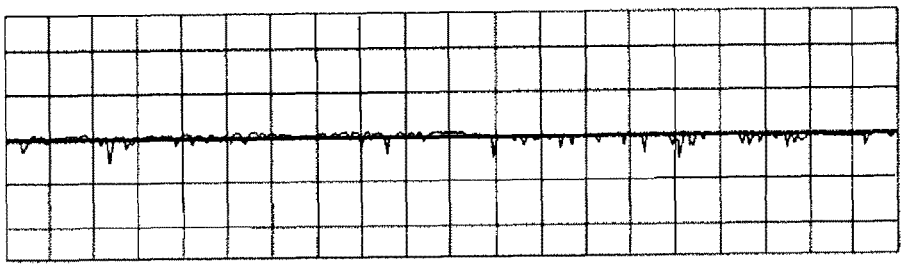

[FIG. 4A]
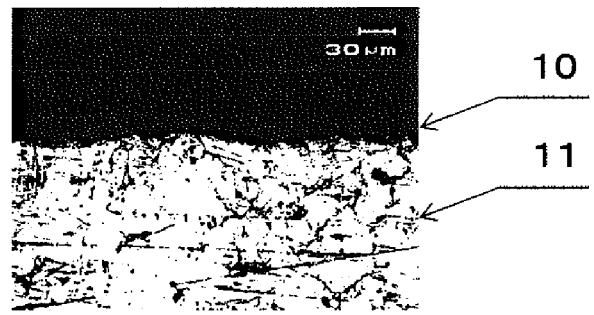
[FIG. 4B]
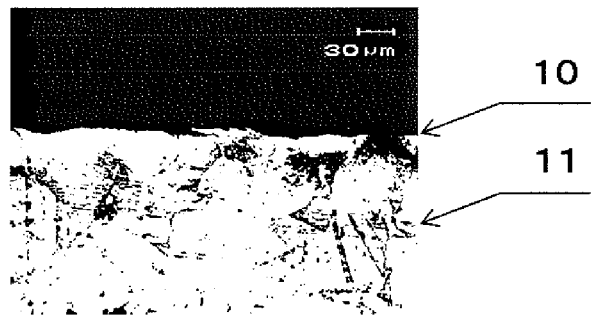
[FIG. 4C]
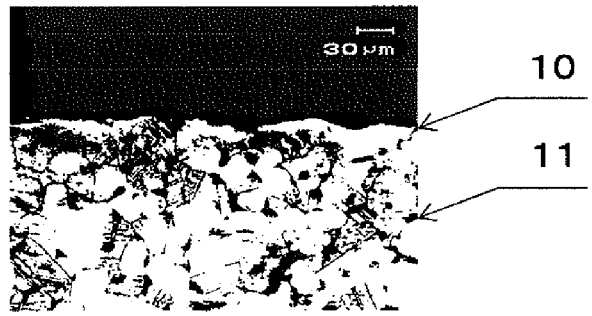

[ FIG. 5A ]
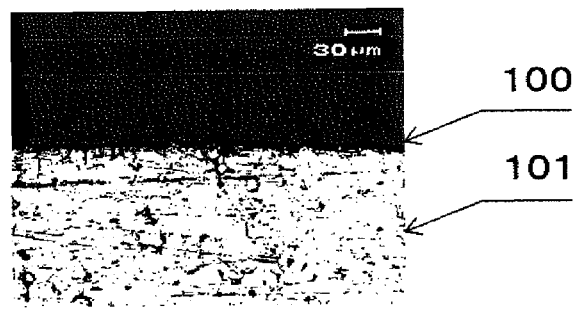
[ FIG. 5B ]
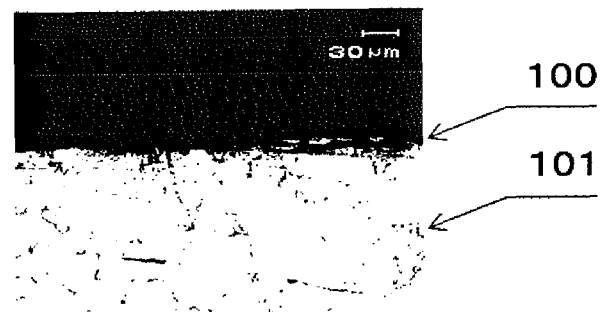
[ FIG. 5C ]
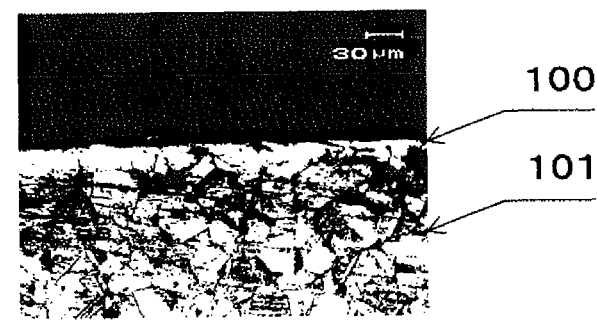

[ FIG. 6A ]
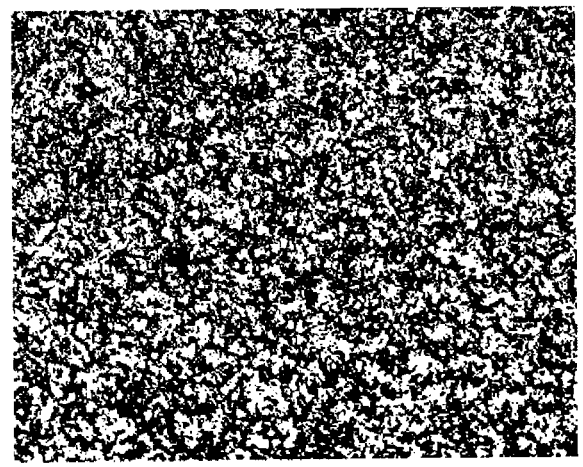
[ FIG. 6B ]
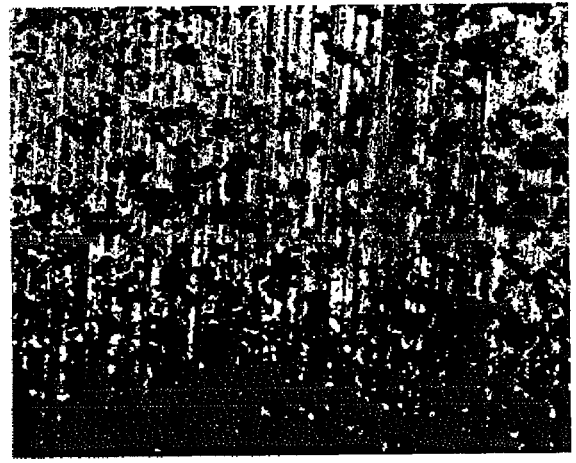

[ FIG. 7A ]
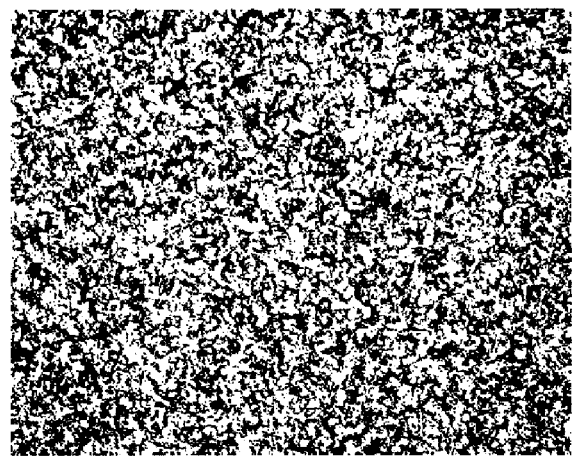
[ FIG. 7B ]
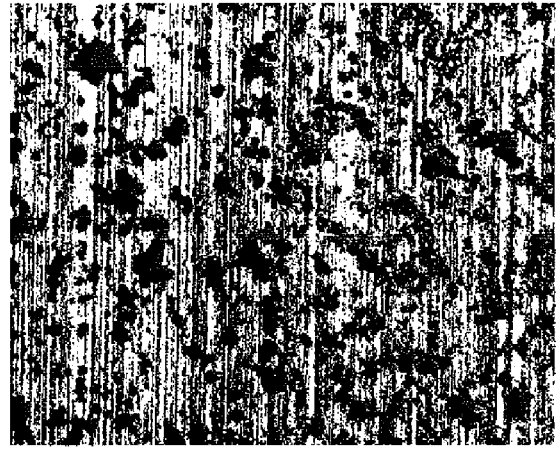

[ FIG. 8A ]
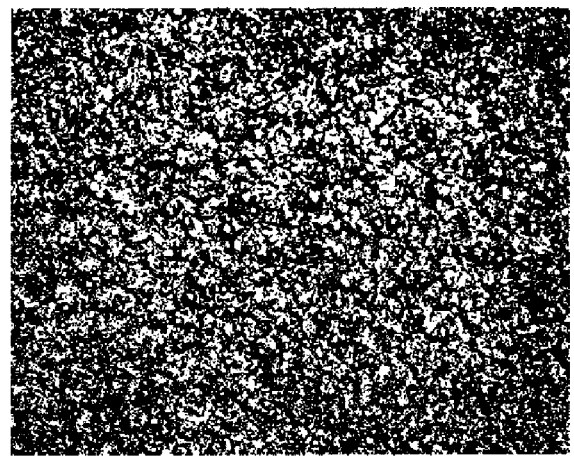
[ FIG. 8B ]
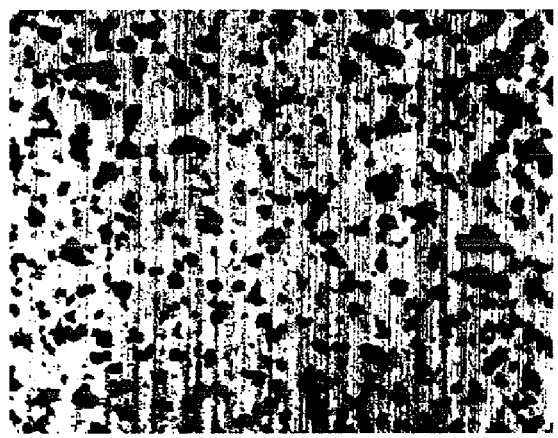

[ FIG. 9A ]
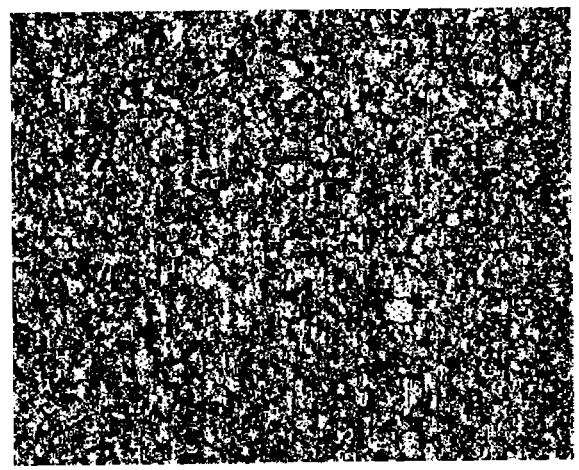
[ FIG. 9B ]
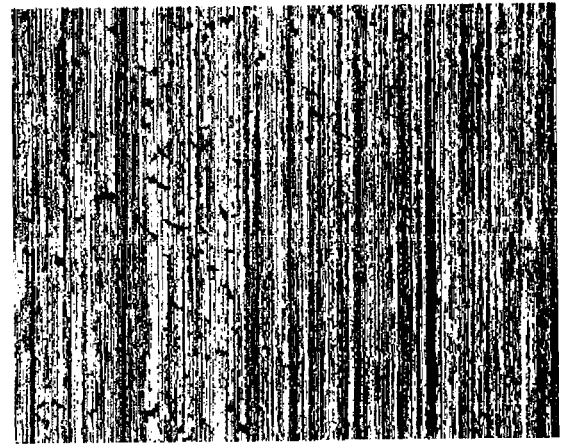

[ FIG. 10A ]
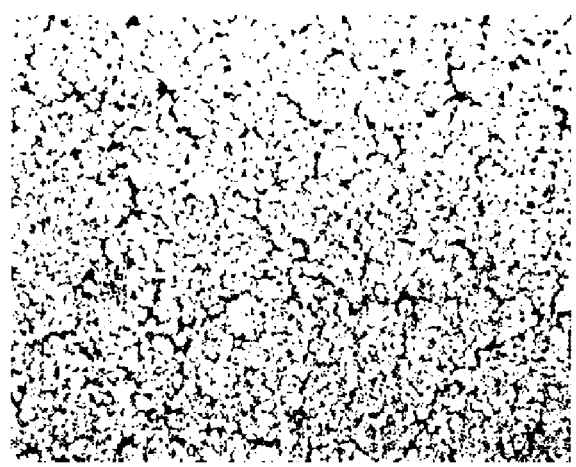
[ FIG. 10B ]
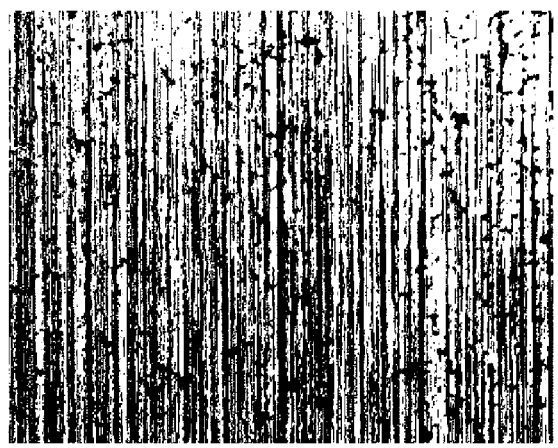

[ FIG. 11A ]
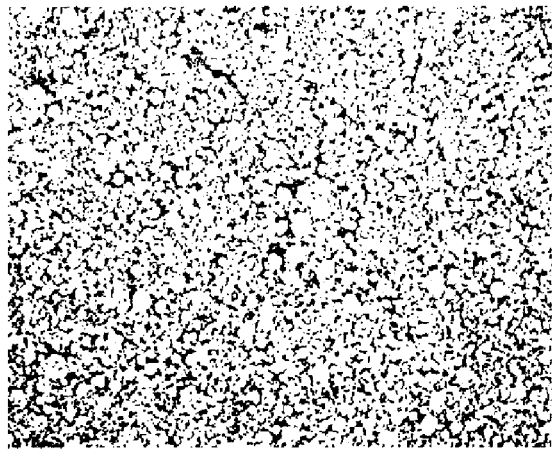
[ FIG. 11B ]
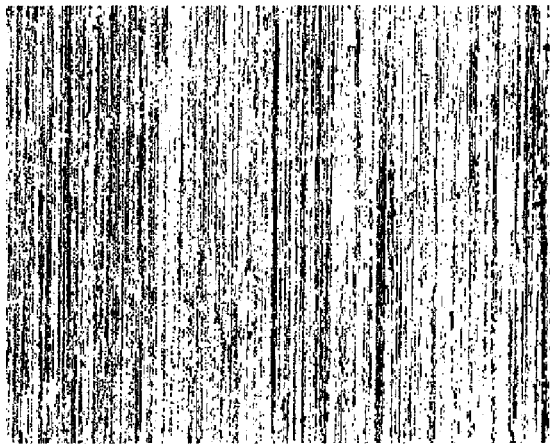

[ FIG. 12A ] 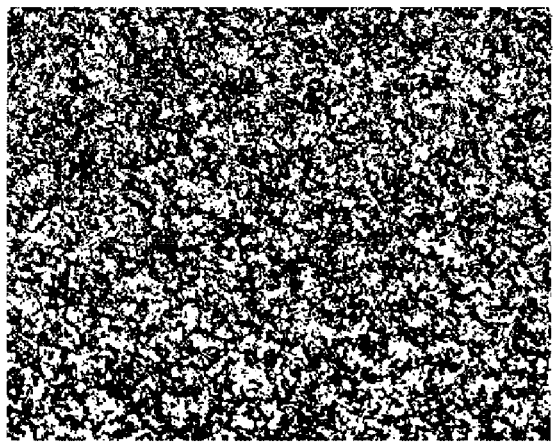
[ FIG. 12B ] 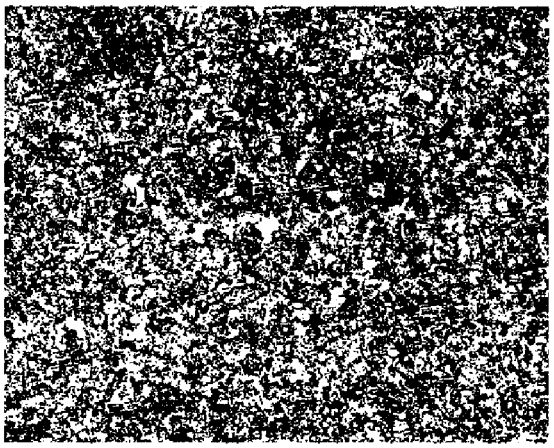

[ FIG. 13A]
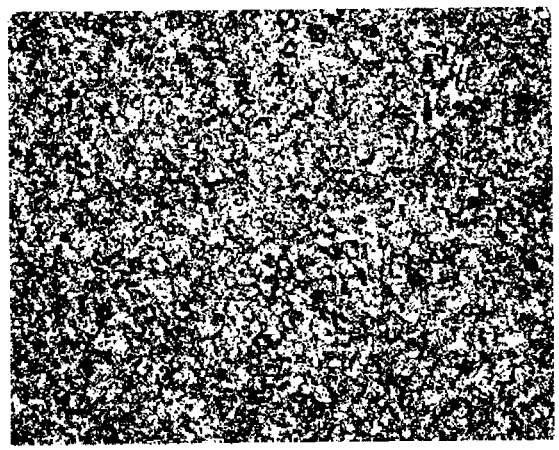
[ FIG. 13B]
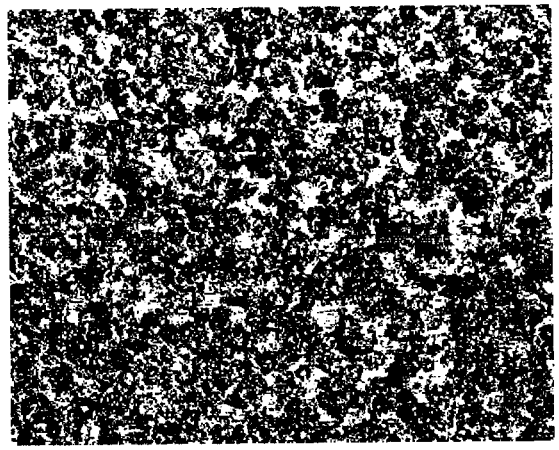

[ FIG. 14A ]
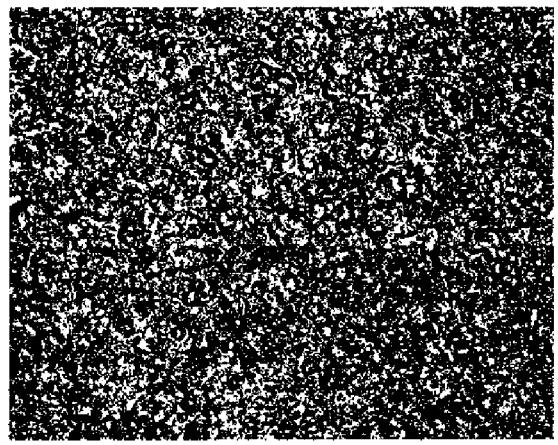
[ FIG. 14B ]
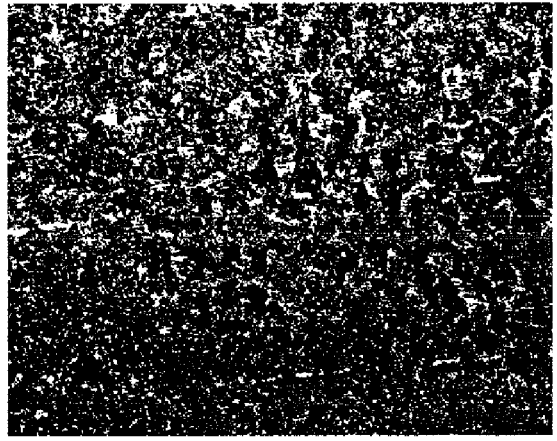

[ FIG. 15A ]
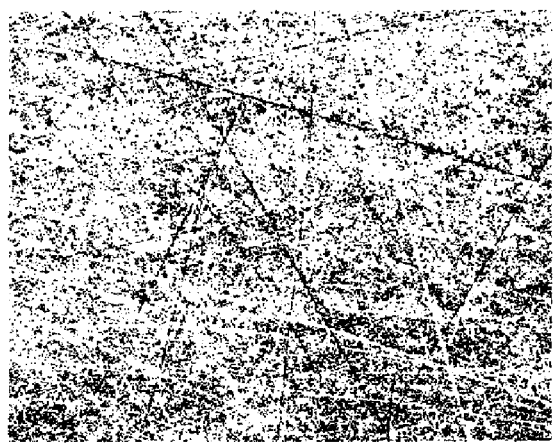
[ FIG. 15B ]
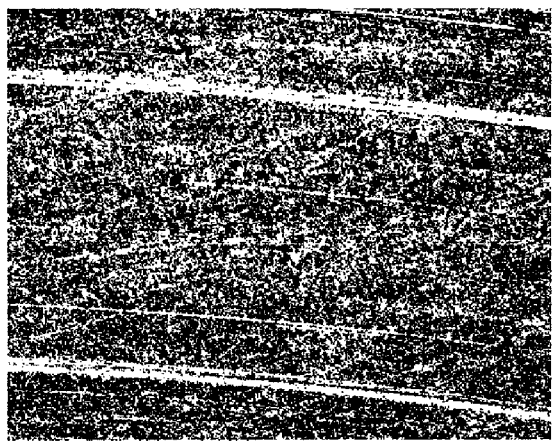

[ FIG. 16A ]
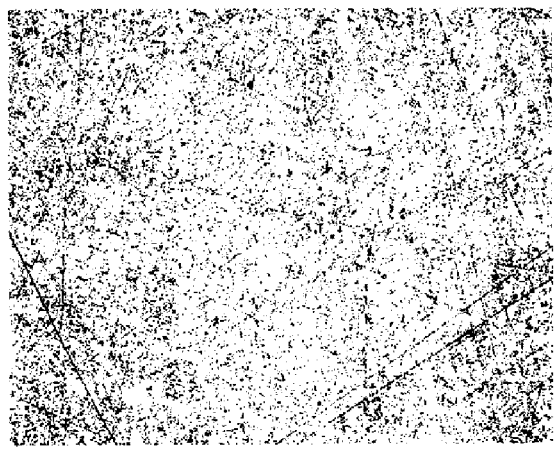
[ FIG. 16B ]
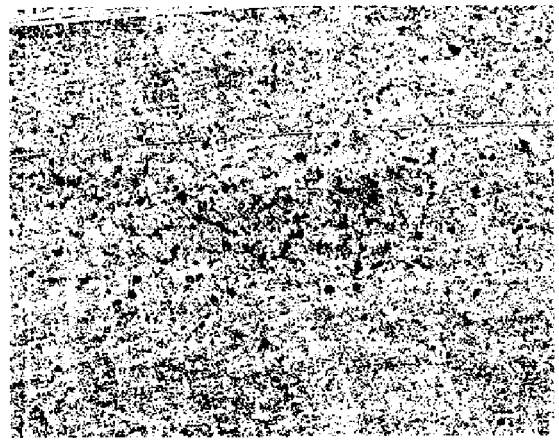

[FIG. 17A]
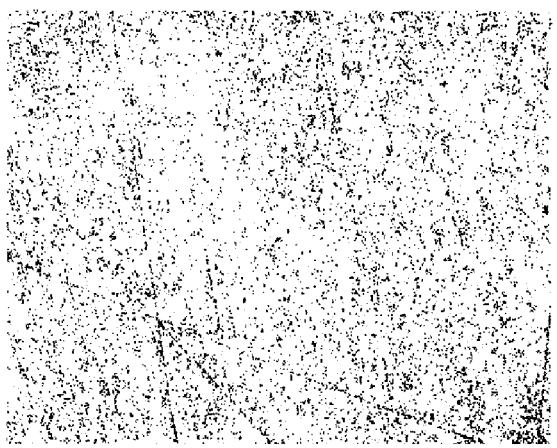
[FIG. 17B]
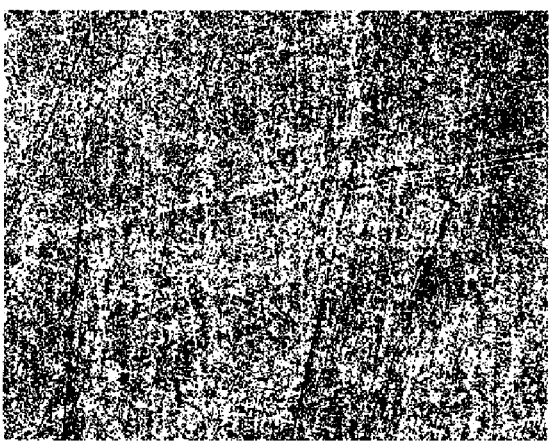

SLIDING MEMBER

CROSS-REFERENCE TO RELATED APPLICATIONS

This application is the United States national phase of International Application No. PCT/JP2014/075477 filed Sep. 25, 2014, and claims priority to Japanese Patent Application No. 2013-202304 filed Sep. 27, 2013, the disclosures of which are hereby incorporated in their entirety by reference.

TECHNICAL FIELD

The present invention relates to a sliding member that slidably supports an object to be slid.

BACKGROUND

In general, it is preferable that a sliding surface has a smooth surface to reduce friction in the sliding surface. However, if the sliding surface is the smooth surface, a friction resistance can be lower but some level of heat is generated at the sliding surface so that there is a possibility that an adhesion occurs in accordance with so-called seizing. Therefore, it is required that the sliding surface has any proper surface roughness.

In the past, forming a concave portion by applying shot-blasting to the sliding surface is a well-known technology. A technology is known to form an oil reservoir on the sliding surface of the sliding member by the shot-blasting treatment (refer to, for example, Patent Document 1).

Patent Document 1: Japanese Patent No. 4848821

SUMMARY OF THE INVENTION

By applying the shot-blasting treatment to the sliding surface, the oil reservoir is formed on the sliding surface to keep a low friction coefficient and to have a good sliding property. However, under a circumstance of hydraulic equipment and the like to which heavy load is applied, there may be a case that cannot keep an uneven shape formed by the shot-blasting treatment depending on hardness of the sliding surface, thereby disabling maintenance of desired sliding property.

The present invention has an object of providing a sliding member which has hardness suitable for a circumstance to which heavy load is applied and excellent abrasion resistance property.

The inventors of the present application have focused on a fact that surface hardness of an object that is subject to the shot blasting treatment is improved and then, have found a combination of the hardness suitable for the circumstance to which the heavy load is applied and the surface roughness for being able to form an oil reservoir suitable for the abrasion resistance property or the like.

The present invention relates to a sliding member in which a sliding surface is formed on a surface of a sliding layer to which a shot-blasting treatment is performed, the surface of the sliding layer has an uneven shape exhibiting arithmetic average roughness (Ra) of more than 0 µm but 2.0 µm or less, ten-point average roughness (Rz) of more than 0 µm but 7.5 µm or less and surface hardness (Hv) of 150-250 and the sliding surface slidably supports an object to be slid. In order to form the sliding surface having the uneven shape exhibiting predetermined surface roughness on the surface of the sliding layer after the shot-blasting treatment is performed, for example, a rubbing operation is executed to a pair of the sliding member and the object to be slid. Then, after the rubbing operation, the sliding member and the object to be slid are used as the pair.

According to the present invention, the oil reservoir is formed on the uneven shape of the sliding surface that exhibits the predetermined surface roughness. By the present invention, the sliding surface is also formed by performing the shot-blasting treatment to the surface of the sliding layer wherein the sliding surface has a surface hardness so as to maintain the uneven shape that makes the oil reservoir.

It is preferable that in the shot-blasting treatment, a grinding material composed of an iron-based metal material having a spherical shape exhibiting a particle size of 180-300 µm and surface hardness (Hv) of 280-600 is used, a spray distance is 50 mm or more but 150 mm or less and grinding time is 5 sec or more but 30 sec or less.

Also, it is preferable that the sliding layer is composed of a copper alloy exhibiting the surface hardness (Hv) of 80-150 before the shot-blasting treatment. Moreover, it is preferable that a thickness of the sliding layer is more than 0 mm but 1.5 mm or less.

According to the sliding member of the present invention, by setting the sliding surface to exhibit the arithmetic average roughness (Ra) of more than 0 µm but 2.0 µm or less and the ten-point average roughness (Rz) of more than 0 µm but 7.5 µm or less, the oil reservoir can be formed on the sliding surface. In addition, since the surface hardness (Hv) of the sliding surface is set to be 150-250, the uneven shape of the sliding surface can be maintained even under the circumstance to which the heavy load is applied.

Thus, it is possible to have high hardness property which is suitable for the circumstance to which the heavy load is applied, and an advantage to suppress the adhesion and corrosion of the sliding member is given while maintaining the abrasion resistance property because it is excellent at cavitation-erosion resistance property in a field of the hydraulic equipment and the like.

BRIEF DESCRIPTION OF DRAWINGS

FIG. 1 is a diagram illustrating one configuration example of a piston pump to which the sliding member of the subject embodiment is applied.

FIG. 2A is a graph illustrating a rough surface shape of the sliding surface of each executed example.

FIG. 2B is a graph illustrating a rough surface shape of the sliding surface of each executed example.

FIG. 2C is a graph illustrating a rough surface shape of the sliding surface of each executed example.

FIG. 3A is a graph illustrating a rough surface shape of the sliding surface of each comparison example.

FIG. 3B is a graph illustrating a rough surface shape of the sliding surface of each comparison example.

FIG. 3C is a graph illustrating a rough surface shape of the sliding surface of each comparison example.

FIG. 4A is a microscope photograph of the sliding surface of each executed example.

FIG. 4B is a microscope photograph of the sliding surface of each executed example.

FIG. 4C is a microscope photograph of the sliding surface of each executed example.

FIG. 5A is a microscope photograph of the sliding surface of each comparison example.

FIG. 5B is a microscope photograph of the sliding surface of each comparison example.

FIG. 5C is a microscope photograph of the sliding surface of each comparison example.

FIG. 6A is a microscope photograph of a sliding surface of a half bearing before and after a test according to an executed example 1.

FIG. 6B is a microscope photograph of the sliding surface of the half bearing before and after the test according to the executed example 1.

FIG. 7A is a microscope photograph of the sliding surface of the half bearing before and after the test according to an executed example 2.

FIG. 7B is a microscope photograph of the sliding surface of the half bearing before and after the test according to the executed example 2.

FIG. 8A is a microscope photograph of the sliding surface of the half bearing before and after the test according to an executed example 3.

FIG. 8B is a microscope photograph of the sliding surface of the half bearing before and after the test according to the executed example 3.

FIG. 9A is a microscope photograph of the sliding surface of the half bearing before and after the test according to a comparison example 1.

FIG. 9B is a microscope photograph of the sliding surface of the half bearing before and after the test according to the comparison example 1.

FIG. 10A is a microscope photograph of the sliding surface of the half bearing before and after the test according to a comparison example 2.

FIG. 10B is a microscope photograph of the sliding surface of the half bearing before and after the test according to the comparison example 2.

FIG. 11A is a microscope photograph of the sliding surface of the half bearing before and after the test according to a comparison example 3.

FIG. 11B is a microscope photograph of the sliding surface of the half bearing before and after the test according to the comparison example 3.

FIG. 12A is a microscope photograph of a sliding surface of a plain bearing before and after the test according to the executed example 1.

FIG. 12B is a microscope photograph of the sliding surface of the plain bearing before and after the test according to the executed example 1.

FIG. 13A is a microscope photograph of the sliding surface of the plain bearing before and after the test according to the executed example 2.

FIG. 13B is a microscope photograph of the sliding surface of the plain bearing before and after the test according to the executed example 2.

FIG. 14A is a microscope photograph of the sliding surface of the plain bearing before and after the test according to the executed example 3.

FIG. 14B is a microscope photograph of the sliding surface of the plain bearing before and after the test according to the executed example 3.

FIG. 15A is a microscope photograph of the sliding surface of the plain bearing before and after the test according to the comparison example 1.

FIG. 15B is a microscope photograph of the sliding surface of the plain bearing before and after the test according to the comparison example 1.

FIG. 16A is a microscope photograph of the sliding surface of the plain bearing before and after the test according to the comparison example 2.

FIG. 16B is a microscope photograph of the sliding surface of the plain bearing before and after the test according to the comparison example 2.

FIG. 17A is a microscope photograph of the sliding surface of the plain bearing before and after the test according to the comparison example 3.

FIG. 17B is a microscope photograph of the sliding surface of the plain bearing before and after the test according to the comparison example 3.

DESCRIPTION OF THE INVENTION

In an sliding member of the present invention, a sliding surface is formed on a surface of a sliding layer to which a shot-blasting treatment is performed, the surface of the shot-blasted sliding layer having an uneven shape exhibiting arithmetic average roughness (Ra) of more than 0 μm but 2.0 μm or less, ten-point average roughness (Rz) of more than 0 μm but 7.5 μm or less and surface hardness (Hv) of 150-250 and the sliding surface slidably supporting an object to be slid. In the sliding member, the sliding surface having a predetermined surface roughness is formed by, for example, rubbing together the surface of the sliding layer and a surface to be slid of an object to be slid after the shot-blasting treatment is performed on the surface of the sliding member. The sliding member is paired with the object to be slid.

In the sliding member of the subject embodiment, the sliding layer is formed with a metal material of a single composition, an alloy material of a predetermined composition, a porous material of an alloy material to which a resin material is impregnated or the like. After the shot-blasting treatment is performed on the surface of the sliding layer, the sliding member and the object to be slid (not shown), which is to be paired, are rubbed together so as to form an oil reservoir and to improve a sliding property, so that the sliding surface exhibiting a desired surface roughness can be formed. Moreover, by performing the shot-blasting treatment to the surface of the sliding layer, the sliding layer is densified and a surface hardness is improved. Therefore, it can form the sliding surface exhibiting a desired surface hardness that is required for a circumstance to which heavy load is applied.

Moreover, the sliding member and the object to be slid are paired after the rubbing operation and they are used as a bearing of a piston pump or the like, which will be described later. The rubbing operation of the sliding member and the object to be slid reduces a friction coefficient between the sliding surface of the sliding layer in the sliding member and the surface to be slid of the object to be slid. Therefore, in an example where they are embedded as a bearing of a cylinder block in the piston pump, a friction of the piston pump is reduced at a starting time.

In the shot-blasting treatment, a grinding material composed of an iron-based metal material having a substantially spherical shape exhibiting a particle size of 180-300 μm and surface hardness (Hv) of 280-600 is used. The shot-blasting treatment is carried out by spraying the above-described grinding material to the surface of the sliding layer under such a condition that a spray distance of the grinding material is 50 mm or more but 150 mm or less and spraying time is 5 sec or more but 30 sec or less.

In this embodiment, the sliding layer having the above-mentioned desired surface roughness and surface hardness is formed on the sliding layer which is formed by a conventional copper alloy exhibiting the surface hardness (Hv) of about 80-150, for example, Cu—Sn-based alloy by performing the rubbing operation between the sliding member and the object to be slid, which is to be paired, after the shot-blasting treatment is performed under the above-mentioned conditions.

Copper (Cu) powder may be also used for the shot-blasting treatment. In the shot-blasting treatment using the copper powder, the copper powder has the particle size of about 350 μm and the hardness of 80-120 Hv so that it is relatively soft. Therefore, an abraded wound at the surface of the sliding layer can be prevented. As a result, a step of forming the sliding surface having a predetermined surface roughness on a surface of the sliding layer can be quickly carried out by the rubbing operation between the sliding member and the object to be slid after the shot-blasting treatment.

Moreover, for the treatment of the surface to be slid of the object to be slid, any blasting treatment for densification may be performed or may not be performed. If the thickness of the sliding layer is too thick, it breaks easily but if this thickness is thin, it is hard to break and its heat conductivity becomes good, so that it is formed to have the thickness of more than 0 mm but 1.5 mm or less, preferably more than 0 but 0.1 mm or less. Since the thickness of the sliding layer is thin, its heat conductivity is improved and its strength is close to that of the iron (Fe)-based alloy for the supporting layer that supports the sliding layer. Therefore, its fatigue strength can be improved.

The sliding member of the subject embodiment has an advantage to suppress the corrosion and fatigue of the alloy because it is excellent at cavitation-erosion resistance property in a field of the hydraulic equipment by enabling the sliding layer to have a high hardness property based on the shot-blasting treatment and particularly, it is preferably applicable to an oil pressure pump or the like. FIG. 1 is a diagram illustrating one configuration example of a piston pump as the hydraulic equipment to which the sliding member of the subject embodiment is applied. FIG. 1 is a typical cross-sectional side view.

A piston pump 1 is attached to a case 3 wherein a cylinder block 2 is supported by an input shaft 20 and the cylinder block 2 is rotated by a driving force transferred through the input shaft 20. The cylinder block 2 is provided with a plurality of cylinders 21 on a rotation direction. A piston 4 is provided in each of the cylinders 21 wherein the piston can be taken in and out.

In the piston pump 1, a plain bearing 5 is provided to support the cylinder block 2 rotatably. The plain bearing 5 includes an inlet port 50 and a discharge port 51 that are opened along the rotation direction of the cylinder block 2. The plain bearing 5 is attached to a position between the cylinder block 2 and the case 3 with the inlet port 50 being communicated to a suction opening 30 provided at the case 3, and the discharge port 51 being communicated to a discharge opening 31 of the case 3. The sliding member of the subject embodiment is applied to the plain bearing 5. The cylinder block 2 rotates under a condition where the cylinder block 2 is pressed as the object to be slid to the shaft direction, so that the cylinder block 2 and the plain bearing 5 slide relatively.

The piston pump 1 is provided with a swash plate 6 which takes the piston 4 in and out with respect to the cylinder 21 of the cylinder block 2 in accordance with the rotation of the cylinder block 2; a yoke 60 which changes an angle of the swash plate 6; and an operating piston 7 and a return spring 8 which drive the swash plate 6 and the yoke 60.

In accordance with the rotation of the cylinder block 2, the piston pump 1 sucks oil by the cylinder 21 where the piston 4 runs out from the cylinder block 2 and discharges the oil by the cylinder 21 where the piston runs in. In the piston pump 1, by changing the angle of the swash plate 6 and the yoke 60, the stroke of the piston 4 changes so that the discharging volume of the oil can be adjusted.

In the piston pump 1, a half bearing 9 is provided at the case 3 to support the swash plate 6 and the yoke 60 swingably. The sliding member of the subject embodiment is applied to the half bearing 9. A shaft portion 61 of the yoke 60 acts as an object to be slid and is swung under a condition where it is pressed to a circumferential direction. Therefore, the shaft portion 61 and the half bearing 9 slide relatively.

In a configuration where the cylinder block 2 rotates in a single direction, the piston pump 1 is configured such that the oil suction and discharge sides are fixed. In a configuration where the cylinder block 2 rotates in both forward and reverse directions, the piston pump 1 is configured such that the oil suction and discharge sides can be switched. The cylinder block 2 slides in one direction or both forward and reverse directions on the circumferential direction under a condition where the plain bearing 5 is pressed to the shaft direction and it receives the heavy load. Thus, the cylinder block 2 and the plain bearing 5 slide in a circular direction under the heavy load condition.

Moreover, in the configuration of the piston pump 1, an oil discharge rate is variable because the swash plate 6 and the yoke 60 swing in both the forward and reverse directions. In the half bearing 9, the shaft portion 61 slides along the circumferential direction in both the forward and reverse directions under the condition where the shaft portion 61 of the yoke 60 is pressed to the circumferential direction under the heavy load condition. Thus, the shaft portion 61 and the half bearing 9 slide in a straight direction under the heavy load condition.

EXECUTED EXAMPLES (1) Shape of Sliding Surface with or without Shot-Blasting Treatment Shapes and surface hardness of sliding surfaces of executed examples 1-3 made by performing the shot-blasting treatment, under the above described conditions, on the sliding layers made of the alloy materials with compositions shown in the following Table 1 were compared with those of sliding surfaces of comparison examples 1-3 made, without performing the shot-blasting treatment, of the alloy materials with compositions shown therein.

TABLE 1

|  | Alloy Composition | Surface Hardness Hv (0.1) |
| --- | --- | --- |
| Executed Example 1 | Cu—Sn | 229 |
| Executed Example 2 | Cu—Sn—Bi | 231 |
| Executed Example 3 | Cu—Sn—Pb | 236 |
| Comparison Example 1 | Cu—Sn | 118 |
| Comparison Example 2 | Cu—Sn—Bi | 116 |
| Comparison Example 3 | Cu—Sn—Pb | 114 |

FIGS. 2A, 2B and 2C are graphs for illustrating the surface roughness shapes of the sliding surfaces of the executed examples. Here, FIGS. 2A, 2B and 2C are based on JIS B 0601 (1994) Standard. FIG. 2A shows the surface roughness shape of the sliding surface composed of the alloy composition of the executed example 1 to which the shot-blasting treatment is applied. FIG. 2B shows the surface roughness shape of the sliding surface composed of the alloy composition of the executed example 2 to which the shot-blasting treatment is applied. FIG. 2C shows the surface roughness shape of the sliding surface composed of the alloy composition of the executed example 3 to which the shot-blasting treatment is applied.

FIGS. 3A, 3B and 3C are graphs for illustrating the surface roughness shapes of the sliding surfaces of the comparison examples. Here, FIGS. 3A, 3B and 3C are based on JIS B 0601 (1994) Standard. FIG. 3A shows the surface roughness shape of the sliding surface composed of the alloy composition of the comparison example 1 to which the shot-blasting treatment is not applied. FIG. 3B shows the surface roughness shape of the sliding surface composed of the alloy composition of the comparison example 2 to which the shot-blasting treatment is not applied. FIG. 3C shows the surface roughness shape of the sliding surface composed of the alloy composition of the comparison example 3 to which the shot-blasting treatment is not applied.

FIGS. 4A, 4B and 4C are microscope photographs of the sliding surface of the executed examples respectively. FIG. 4A is the microscope photograph of the sliding surface composed of the alloy composition of the executed example 1 to which the shot-blasting treatment is applied. FIG. 4B is the microscope photograph of the sliding surface composed of the alloy composition of the executed example 2 to which the shot-blasting treatment is applied. FIG. 4C is the microscope photograph of the sliding surface composed of the alloy composition of the executed example 3 to which the shot-blasting treatment is applied.

FIGS. 5A, 5B and 5C are microscope photographs of the sliding surface of the comparison examples respectively. FIG. 5A is the microscope photograph of the sliding surface composed of the alloy composition of the comparison example 1 to which the shot-blasting treatment is not applied. FIG. 5B is the microscope photograph of the sliding surface composed of the alloy composition of the comparison example 2 to which the shot-blasting treatment is not applied. FIG. 5C is the microscope photograph of the sliding surface composed of the alloy composition of the comparison example 3 to which the shot-blasting treatment is not applied.

As shown in FIGS. 2A, 2B and 2C and also FIGS. 4A, 4B and 4C, in each executed example, the sliding surface 10 became an uneven shape by performing the shot-blasting treatment to the sliding layer 11. For the executed example 1 where the alloy composition was Cu—Sn, the sliding surface 10 after the shot-blasting treatment exhibited the arithmetic average roughness (Ra) of 2.299 μm, the ten-point average roughness (Rz) of 8.739 μm and an average distance (Sm) between a concavity and a convexity of 0.3114 mm. Moreover, the surface hardness (Hv) thereof was 229 as shown in Table 1.

In the executed example 2 where the alloy composition was Cu—Sn—Bi, the sliding surface 10 after the shot-blasting treatment exhibited the arithmetic average roughness (Ra) of 2.344 μm, the ten-point average roughness (Rz) of 8.286 μm and the average distance (Sm) of the concavity and the convexity of 0.2244 mm. Moreover, the surface hardness (Hv) thereof was 231.

In the executed example 3 where the alloy composition was Cu—Sn—Pb, the sliding surface 10 after the shot-blasting treatment exhibited the arithmetic average roughness (Ra) of 1.821 μm, the ten-point average roughness (Rz) of 7.071 μm and the average distance (Sm) of the concavity and the convexity of 0.2067 mm. Moreover, the surface hardness (Hv) thereof was 236.

On the other hand, as shown in FIGS. 3A, 3B and 3C and also FIGS. 5A, 5B and 5C, in each comparison example, the sliding surface 100 became a flat shape because the shot-blasting treatment was not performed on the sliding layer 101. For the comparison example 1 where the alloy composition was Cu—Sn, the arithmetic average roughness (Ra) was 1.198 μm, the ten-point average roughness (Rz) was 7.976 μm and the average distance (Sm) between the concavity and the convexity was 0.2378 mm. Moreover, the surface hardness (Hv) thereof was 116 as shown in Table 1.

In the comparison example 2 where the alloy composition was Cu—Sn—Bi, the arithmetic average roughness (Ra) was 0.931 μm, the ten-point average roughness (Rz) was 8.091 μm and the average distance (Sm) of the concavity and the convexity was 0.3547 mm. Moreover, the surface hardness (Hv) thereof was 116.

In the comparison example 3 where the alloy composition was Cu—Sn—Pb, the arithmetic average roughness (Ra) was 0.5784 μm, the ten-point average roughness (Rz) was 4.074 μm and the average distance (Sm) of the concavity and the convexity was 0.2732 mm. Moreover, the surface hardness (Hv) thereof was 114.

From the above-described results, it has been found that, in each executed example where the shot-blasting treatment is performed, the uneven shapes are formed at the upper and lower sides with respect to a roughness center line O. On the other hand, it has been found that, in each comparison example where the shot-blasting treatment is not performed, there is substantially no convex portion at the upper side with respect to the roughness center line O. In addition, it has been found that, by performing the shot-blasting treatment, the surface hardness is improved approximately two-fold by comparison with the case where the shot-blasting treatment is not performed.

(2) Durability Relation with or without Shot-Blasting Treatment

In order to verify impact of the above-described differences of the surface shapes that affects the durability such as adhesion, abrasion and corrosion, a test was executed by using the piston pump 1 as shown in FIG. 1. As the sliding members to be tested, the plain shafts 5 and the half bearings 9 having the sliding surfaces 10 of the above-described executed examples 1-3 to which the shot-blasting treatment was applied and the plain shafts 5 and the half bearings 9 having the sliding surfaces 100 of the above-described comparison examples 1-3 to which the shot-blasting treatment is not applied were manufactured. The test condition was as follows.

Cut-Off Durability Test
Discharge Pressure: 0-28 MPa
Cycle Number: 30,000 cycles (ON: 1 sec, OFF: 1 sec)
Oil Temperature: 60° C.
Shaft Rotation Number: N=1,800 rpm FIGS. 6A and 6B, FIGS. 7A and 7B and FIGS. 8A and 8B are microscope photographs of the sliding surfaces of the half bearings in the executed examples before and after the test respectively. FIG. 6A is the microscope photograph of the sliding surface of the half bearing before the test wherein it is composed of the alloy composition of the above-described executed example 1 and the shot-blasting treatment is performed. FIG. 6B is the microscope photograph of the sliding surface of the half bearing after the test wherein it is composed of the alloy composition of the above-described executed example 1 and the shot-blasting treatment is performed.

FIG. 7A is the microscope photograph of the sliding surface of the half bearing before the test wherein it is composed of the alloy composition of the above-described executed example 2 and the shot-blasting treatment is performed. FIG. 7B is the microscope photograph of the sliding surface of the half bearing after the test wherein it is composed of the alloy composition of the above-described executed example 2 and the shot-blasting treatment is performed.

FIG. 8A is the microscope photograph of the sliding surface of the half bearing before the test wherein it is composed of the alloy composition of the above-described executed example 3 and the shot-blasting treatment is performed. FIG. 8B is the microscope photograph of the sliding surface of the half bearing after the test wherein it is composed of the alloy composition of the above-described executed example 3 and the shot-blasting treatment is performed.

FIGS. 9A and 9B, FIGS. 10A and 10B and FIGS. 11A and 11B are microscope photographs of the sliding surfaces of the half bearings in the comparison examples before and after the test respectively. FIG. 9A is the microscope photograph of the sliding surface of the half bearing before the test wherein it is composed of the alloy composition of the above-described comparison example 1 and the shot-blasting treatment is not performed. FIG. 9B is the microscope photograph of the sliding surface of the half bearing after the test wherein it is composed of the alloy composition of the above-described comparison example 1 and the shot-blasting treatment is not performed.

FIG. 10A is the microscope photograph of the sliding surface of the half bearing before the test wherein it is composed of the alloy composition of the above-described comparison example 2 and the shot-blasting treatment is not performed. FIG. 10B is the microscope photograph of the sliding surface of the half bearing after the test wherein it is composed of the alloy composition of the above-described comparison example 2 and the shot-blasting treatment is not performed.

FIG. 11A is the microscope photograph of the sliding surface of the half bearing before the test wherein it is composed of the alloy composition of the above-described comparison example 3 and the shot-blasting treatment is not performed. FIG. 11B is the microscope photograph of the sliding surface of the half bearing after the test wherein it is composed of the alloy composition of the above-described comparison example 3 and the shot-blasting treatment is not performed.

In the half bearing 9 to which the sliding member of the executed example 1, alloy composition of which was Cu—Sn, shown in FIGS. 6A and 6B, was applied, the uneven shape formed at the upper and lower sides of the roughness center line O by the shot-blasting treatment as shown in FIG. 2A. The uneven shape formed the oil reservoir on the sliding surface so that it acts to hold an oil film. There was no sign of the adhesion on the sliding surface after the test as shown in FIG. 6B.

The surface hardness of the sliding surface is improved by the shot-blasting treatment so that the uneven shape of the sliding surface formed by the shot-blasting treatment as shown in FIG. 6A remained on the sliding surface after the test as shown in FIG. 6B.

On the other hand, in the half bearing 9 to which the sliding member of the comparison example 1, the alloy composition of which was Cu—Sn, shown in FIGS. 9A and 9B, was applied, there was substantially no convex portion at the upper side of the roughness center line O as shown in FIG. 3A. Therefore, the oil reservoir was not formed and a sign of the adhesion was seen on the sliding surface after the test as shown in FIG. 9B. The sign of the adhesion was also seen on the sliding surface side as well as the shaft portion 61 in FIG. 1 that acted as the object to be slid. It suggests that the sliding and touching portion in which the sliding surface and the object to be slid are touched generates any heat.

Here, the alloy composition of the executed example 1 does not include Pb exhibiting a self-lubricating effect. It has been found that if an oil film can be kept appropriately under boundary lubrication without adding Pb, it can prevent the adhesion from generating.

Also, in the half bearing 9 to which the sliding member of the executed example 2, the alloy composition of which was Cu—Sn—Bi, shown in FIGS. 7A and 7B, was applied, the uneven shape formed at the upper and lower sides of the roughness center line O by the shot-blasting treatment as shown in FIG. 2B. The uneven shape formed the oil reservoir on the sliding surface so that it acts to hold an oil film. There was no sign of the adhesion on the sliding surface after the test as shown in FIG. 7B.

Further, the surface hardness of the sliding surface was improved by the shot-blasting treatment so that the uneven shape of the sliding surface formed by the shot-blasting treatment as shown in FIG. 7A remained on the sliding surface after the test as shown in FIG. 7B.

On the other hand, in the half bearing 9 to which the sliding member of the comparison example 2, the alloy composition of which was Cu—Sn—Bi, shown in FIGS. 10A and 10B, was applied, there was substantially no convex portion at the upper side of the roughness center line O as shown in FIG. 3B. Therefore, the oil reservoir was not formed and a sign of the adhesion was seen on the sliding surface after the test as shown in FIG. 10B. The sign of the adhesion was also seen on the sliding surface side as well as the shaft portion 61 in FIG. 1 that acted as the object to be slid. It suggests that the sliding and touching portion in which the sliding surface and the object to be slid are touched generates any heat.

Also, in the half bearing 9 to which the sliding member of the executed example 3, the alloy composition of which was Cu—Sn—Pb, shown in FIGS. 8A and 8B, was applied, the uneven shape formed at the upper and lower sides of the roughness center line O by the shot-blasting treatment as shown in FIG. 2C. The uneven shape formed the oil reservoir on the sliding surface so that it acts to hold an oil film. There was no sign of the adhesion on the sliding surface after the test as shown in FIG. 8B.

Further, the surface hardness of the sliding surface was improved by the shot-blasting treatment so that the uneven shape of the sliding surface formed by the shot-blasting treatment as shown in FIG. 8A remained on the sliding surface after the test as shown in FIG. 8B.

On the other hand, in the half bearing 9 to which the sliding member of the comparison example 3, the alloy composition of which was Cu—Sn—Pb, shown in FIGS. 11A and 11B, was applied, there was substantially no convex portion at the upper side of the roughness center line O as shown in FIG. 3C. Therefore, the oil reservoir was not formed and a sign of the adhesion was seen on the sliding surface after the test as shown in FIG. 11B. The sign of the adhesion was also seen on the sliding surface side as well as the shaft portion 61 in FIG. 1 that acted as the object to be slid. It suggests that the sliding and touching portion in which the sliding surface and the object to be slid are touched generates any heat.

As the above description, in the sliding member of each executed example, it has been found that the adhesion and the abrasion are suppressed in regard to the formation of the oil film under the boundary lubrication by providing the uneven shape on the sliding surface by the shot-blasting treatment and improving the surface hardness. Therefore, it has been found that if the sliding member of each executed example is applied to the half bearing 9 of the piston pump 1 shown in FIG. 1, the resistance of the adhesion and the abrasion is improved.

FIGS. 12A and 12B, FIGS. 13A and 13B and FIGS. 14A and 14B are microscope photographs of the sliding surface of the plain bearing before and after the test in each executed example. Here, FIG. 12A is the microscope photograph of the sliding surface of the plain bearing before the test to which the shot-blasting treatment is applied under the alloy composition of the above described executed example 1. FIG. 12B is the microscope photograph of the sliding surface of the plain bearing after the test to which the shot-blasting treatment is applied under the alloy composition of the executed example 1.

FIG. 13A is the microscope photograph of the sliding surface of the plain bearing before the test to which the shot-blasting treatment is applied under the alloy composition of the above-described executed example 2. FIG. 13B is the microscope photograph of the sliding surface of the plain bearing after the test to which the shot-blasting treatment is applied under the alloy composition of the executed example 2.

FIG. 14A is the microscope photograph of the sliding surface of the plain bearing before the test to which the shot-blasting treatment is applied under the alloy composition of the above-described executed example 3. FIG. 14B is the microscope photograph of the sliding surface of the plain bearing after the test to which the shot-blasting treatment is applied under the alloy composition of the executed example 3.

FIGS. 15A and 15B, FIGS. 16A and 16B and FIGS. 17A and 17B are microscope photographs of the sliding surface of the plain bearing before and after the test in each comparison example. Here, FIG. 15A is the microscope photograph of the sliding surface of the plain bearing before the test to which the shot-blasting treatment is not applied under the alloy composition of the above-described comparison example 1. FIG. 15B is the microscope photograph of the sliding surface of the plain bearing after the test to which the shot-blasting treatment is not applied under the alloy composition of the comparison example 1.

FIG. 16A is the microscope photograph of the sliding surface of the plain bearing before the test to which the shot-blasting treatment is not applied under the alloy composition of the above-described comparison example 2. FIG. 16B is the microscope photograph of the sliding surface of the plain bearing after the test to which the shot-blasting treatment is not applied under the alloy composition of the comparison example 2.

FIG. 17A is the microscope photograph of the sliding surface of the plain bearing before the test to which the shot-blasting treatment is not applied under the alloy composition of the above-described comparison example 3. FIG. 17B is the microscope photograph of the sliding surface of the plain bearing after the test to which the shot-blasting treatment is not applied under the alloy composition of the comparison example 3.

Also, in the plain bearing 5 to which the sliding member of the executed example 1, the alloy composition of which was Cu—Sn, shown in FIGS. 12A and 12B, was applied, the uneven shape formed at the upper and lower sides of the roughness center line O by the shot-blasting treatment as shown in FIG. 2A. The uneven shape formed the oil reservoir on the sliding surface so that it acts to hold an oil film. There was no corrosion on the sliding surface adjacent to the discharge port 51 producing a jet flow, shown in FIG. 1, after the test as shown in FIG. 12B.

Further, the surface hardness of the sliding surface was improved by the shot-blasting treatment so that the uneven shape of the sliding surface formed by the shot-blasting treatment as shown in FIG. 12A remained on the sliding surface after the test as shown in FIG. 12B.

On the other hand, in the plain bearing 5 to which the sliding member of the comparison example 1, the alloy composition of which was Cu—Sn, shown in FIGS. 15A and 15B, was applied, there was substantially no convex portion at the upper side of the roughness center line O as shown in FIG. 3A. Therefore, the oil reservoir was not formed and the corrosion based on the jet flow was seen on the sliding surface after the test as shown in FIG. 15B.

Also, in the plain bearing 5 to which the sliding member of the executed example 2, the alloy composition of which was Cu—Sn—Bi, shown in FIGS. 13A and 13B, was applied, the uneven shape formed at the upper and lower sides of the roughness center line O by the shot-blasting treatment as shown in FIG. 2B. The uneven shape formed the oil reservoir on the sliding surface so that it acts to hold an oil film. There was no corrosion on the sliding surface adjacent to the discharge port 51 producing a jet flow, shown in FIG. 1, after the test as shown in FIG. 13B.

Further, the surface hardness of the sliding surface was improved by the shot-blasting treatment so that the uneven shape of the sliding surface formed by the shot-blasting treatment as shown in FIG. 13A remained on the sliding surface after the test as shown in FIG. 13B.

On the other hand, in the plain bearing 5 to which the sliding member of the comparison example 2, the alloy composition of which was Cu—Sn—Bi, shown in FIGS. 16A and 16B, was applied, there was substantially no convex portion at the upper side of the roughness center line O as shown in FIG. 3B. Therefore, the oil reservoir was not formed and the corrosion based on the jet flow was seen on the sliding surface after the test as shown in FIG. 16B.

Also, in the plain bearing 5 to which the sliding member of the comparison example 3, the alloy composition of which was Cu—Sn—Pb, shown in FIGS. 14A and 14B, was applied, the uneven shape formed at the upper and lower sides of the roughness center line O by the shot-blasting treatment as shown in FIG. 2C. The uneven shape formed the oil reservoir on the sliding surface so that it acts to hold an oil film. There was no corrosion on the sliding surface adjacent to the discharge port 51 producing a jet flow, shown in FIG. 1, after the test as shown in FIG. 14B.

Further, the surface hardness of the sliding surface was improved by the shot-blasting treatment so that the uneven shape of the sliding surface formed by the shot-blasting treatment as shown in FIG. 14A remained on the sliding surface after the test as shown in FIG. 14B.

On the other hand, in the plain bearing 5 to which the sliding member of the comparison example 3, the alloy composition of which was Cu—Sn—Pb, shown in FIGS. 17A and 17B, was applied, there was substantially no convex portion at the upper side of the roughness center line O as shown in FIG. 3B. Therefore, the oil reservoir was not formed and the corrosion based on the jet flow was seen on the sliding surface after the test as shown in FIG. 17B.

(3) Rubbing Operation after Shot-Blasting Treatment

The rubbing operation with the object to be slid was performed on the surface of the sliding layer 11 having the arithmetic average roughness (Ra) of more than 0 μm but 2.5

µm or less, the ten-point average roughness (Rz) of more than 0 µm but 10.0 µm or less and the surface hardness (Hv) of 150-250 formed by the shot-blasting treatment. The rubbing operation after the shot-blasting treatment formed the sliding surface 10 exhibiting the arithmetic average roughness (Ra) of more than 0 µm but 2.0 µm or less, the ten-point average roughness (Rz) of more than 0 µm but 7.5 µm or less and the surface hardness (Hv) of 150-250.

As described hereinbefore, it has been found that the corrosion based on the jet flow is suppressed in regard to the formation of the oil film under the boundary lubrication by providing the sliding surface having the uneven shape by the shot-blasting treatment and the rubbing operation to form the oil reservoir on the surface of the sliding layer and improving the surface hardness of the sliding surface by the shot-blasting operation. Therefore, it has been found that if the sliding member of each executed example is applied to the plain bearing 5 or the like of the piston pump 1 shown in FIG. 1, the resistance of the adhesion and the abrasion is improved.

Since the sliding member according to the present invention exhibits the resistance of the adhesion, abrasion and corrosion even under the boundary lubricating, it is preferably applicable to the bearing of the hydraulic equipment to which the heavy load is applied.

The invention claimed is:

1. A sliding member comprising a sliding surface formed on a surface of a sliding layer which is impact-hardened by a shot-blasting treatment, the sliding member and an object to be slid being rubbed together, wherein a surface of the sliding surface has an uneven shape to form an oil reservoir, wherein the sliding surface exhibits arithmetic average roughness (Ra) of more than 0 µm and 2.0 µm or less, ten-point average roughness (Rz) of more than 0 µm and 7.5 µm or less and surface hardness (HV) of 150-250, and the sliding surface slidably supports the object to be slid,
   wherein the sliding layer is composed of a copper alloy having a surface hardness (HV) of 80-150 before the shot-blasting treatment.

2. The sliding member according to claim 1, wherein a thickness of said sliding layer is more than 0 mm and 1.5 mm or less.

3. A piston pump, comprising:
   a cylinder block;
   a plain bearing supporting the cylinder block; and
   a sliding member of claim 1 applied to the plain bearing,
   wherein the sliding member and the cylinder block are rubbed together and the sliding surface slidably supports the cylinder block.

\* \* \* \* \*